United States Patent [19]

Bodine

[11] Patent Number: 5,030,034
[45] Date of Patent: Jul. 9, 1991

[54] SOIL POLLUTION MONITORING SYSTEM AND APPARATUS

[76] Inventor: Albert G. Bodine, 7877 Woodley Ave., Van Nuys, Calif. 91406

[21] Appl. No.: 299,038

[22] Filed: Jan. 19, 1989

[51] Int. Cl.$^5$ .............................................. E02D 7/12
[52] U.S. Cl. ...................................... 405/128; 405/246; 405/248; 405/270; 405/271; 405/276
[58] Field of Search ............... 405/128, 129, 232, 248, 405/267, 270, 271, 274, 276, 246

[56] References Cited

U.S. PATENT DOCUMENTS

| | | | |
|---|---|---|---|
| 2,815,656 | 12/1957 | Klein | 52/169.9 X |
| 3,383,863 | 5/1968 | Berry | 405/270 |
| 3,889,482 | 6/1975 | Frederick | 405/274 |
| 4,048,778 | 9/1977 | Krings | 405/282 |
| 4,372,709 | 2/1983 | Krings | 405/272 X |
| 4,436,452 | 3/1984 | Bodine | 405/232 |
| 4,484,835 | 11/1984 | van Klinken | 405/270 X |
| 4,557,630 | 12/1985 | Neil | 405/232 |
| 4,678,369 | 7/1987 | Gläser | 405/128 |

FOREIGN PATENT DOCUMENTS 108537 8/1980 Japan .................................... 405/274

Primary Examiner—Dennis L. Taylor
Assistant Examiner—Arlen L. Olsen
Attorney, Agent, or Firm—Edward A. Sokolski

[57] ABSTRACT

A pair of spaced walls which may be formed from corrugated metal sheets are joined together with a bottom plate being attached to the edges of the walls to form a box-like structure. A drive shoe formed by a pair of plates may be attached to the bottom of the structure. A sonic oscillator is attached to the top edges of the structure and sonic energy, preferably at a frequency which causes resonant standing wave vibration of the box-like structure, is applied to such structure so as to drive it into the ground. Successive sections of similar box-like structures are driven into the ground in end to end overlapping relationship to form an elongated box structure installed in the soil. This structure is employed to provide a barrier against the migration of soil pollutants. Further, soil samples can be taken from the area contained by the box-like structure to evaluate the effectiveness of the barrier provided by the first wall. The device can also be utilized as a contaminant monitor by providing perforations in the first wall to collect samples of liquid for evaluation by a contaminant monitor.

8 Claims, 4 Drawing Sheets

SOIL POLLUTION MONITORING SYSTEM AND APPARATUS

This invention relates to soil pollution and more particularly to a method and apparatus employing a box-like structure installed in the soil for use in containing and monitoring soil pollution.

With the dumping of pollutants and hazardous wastes into the ground, the migration of such undesirable waste material from the dump site to adjacent areas has become a serious problem. To take effective action, means must be provided for monitoring the adjacent soil to determine when such migration has occurred and in such instances to provide a barrier to reduce further migration of the polluting substance.

The present invention is directed to providing a method and apparatus for containing the spread of soil pollutants and for monitoring the condition of the soil with regard to polluting substances.

Briefly described, the method and apparatus of the invention employs a box-like structure formed from opposing sheets of metal with a bottom plate attached thereto. The metal sheets may be corrugated and joined together at their corrugations. This box like structure may have a drive shoe attached to the bottom thereof and is sonically driven into the grounds by means of a sonic oscillator coupled to the top edge thereof. The sonic oscillator is preferably adjusted to a frequency which provides resonant elastic vibration of the driven structure to greatly facilitate the penetration and soil compaction therearound. Successive sections of the box-like structure can be driven into the ground in end to end overlapping relationship to form an elongated unitary barrier wall and monitoring box.

It is therefore an object of this invention to facilitate the containment and monitoring of soil pollution.

It is a further object of this invention to provide a method and apparatus for installing a barrier wall and box-like soil containment structure in the ground by means of sonic driving.

Other objects of the invention will become apparent as the description proceeds in connection with the accompanying drawings of which:

Figure 1:
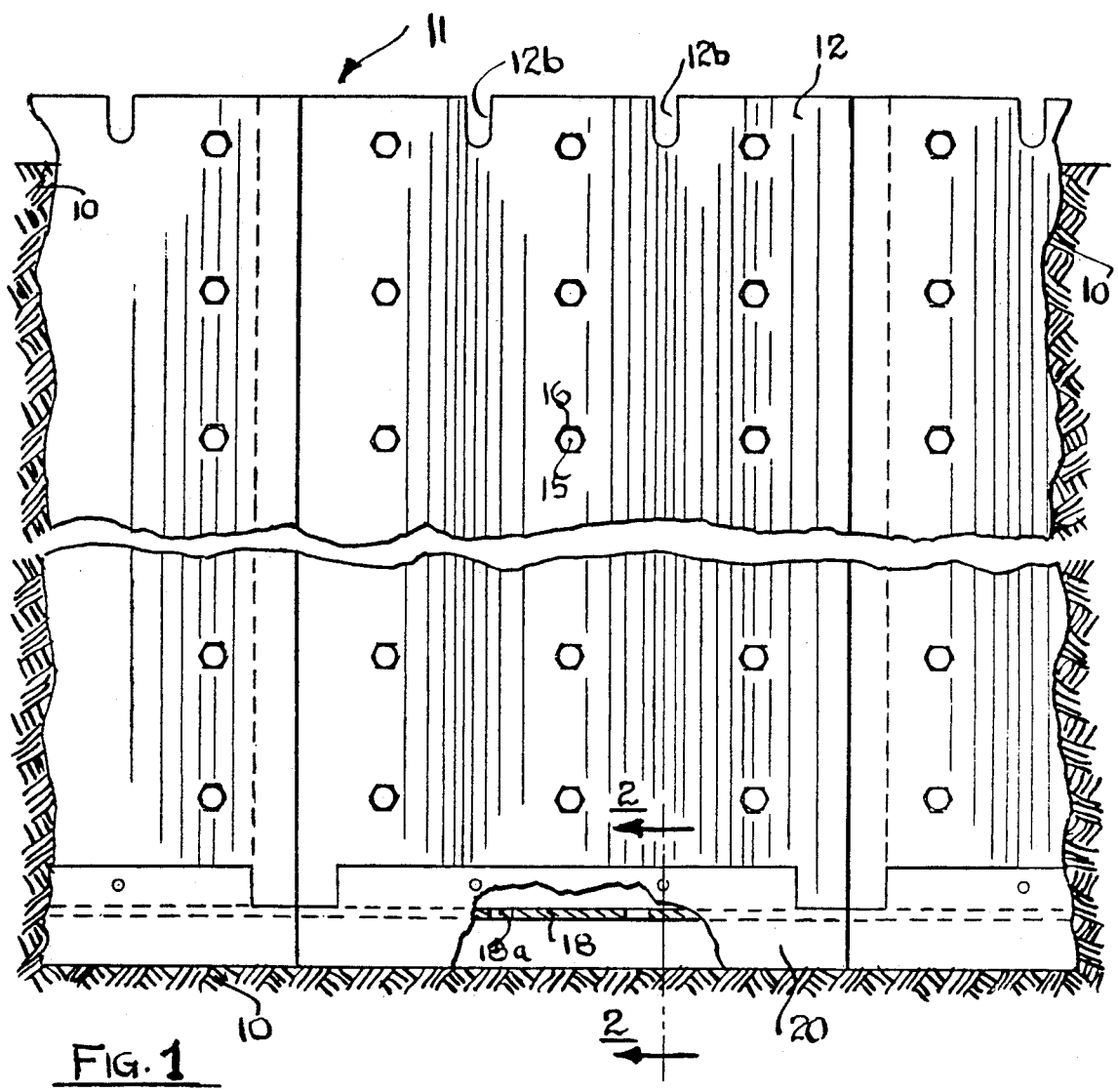
FIG. 1 is a side elevational view of a preferred embodiment of the barrier box-like structure of the invention installed in the grounds.
Figure 3:
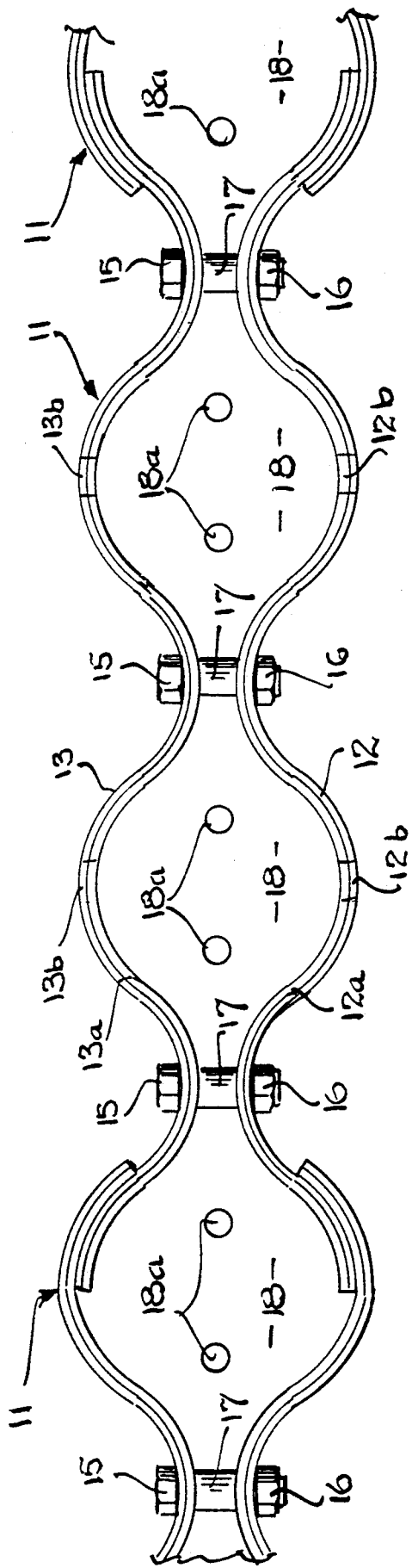
Figure 4:
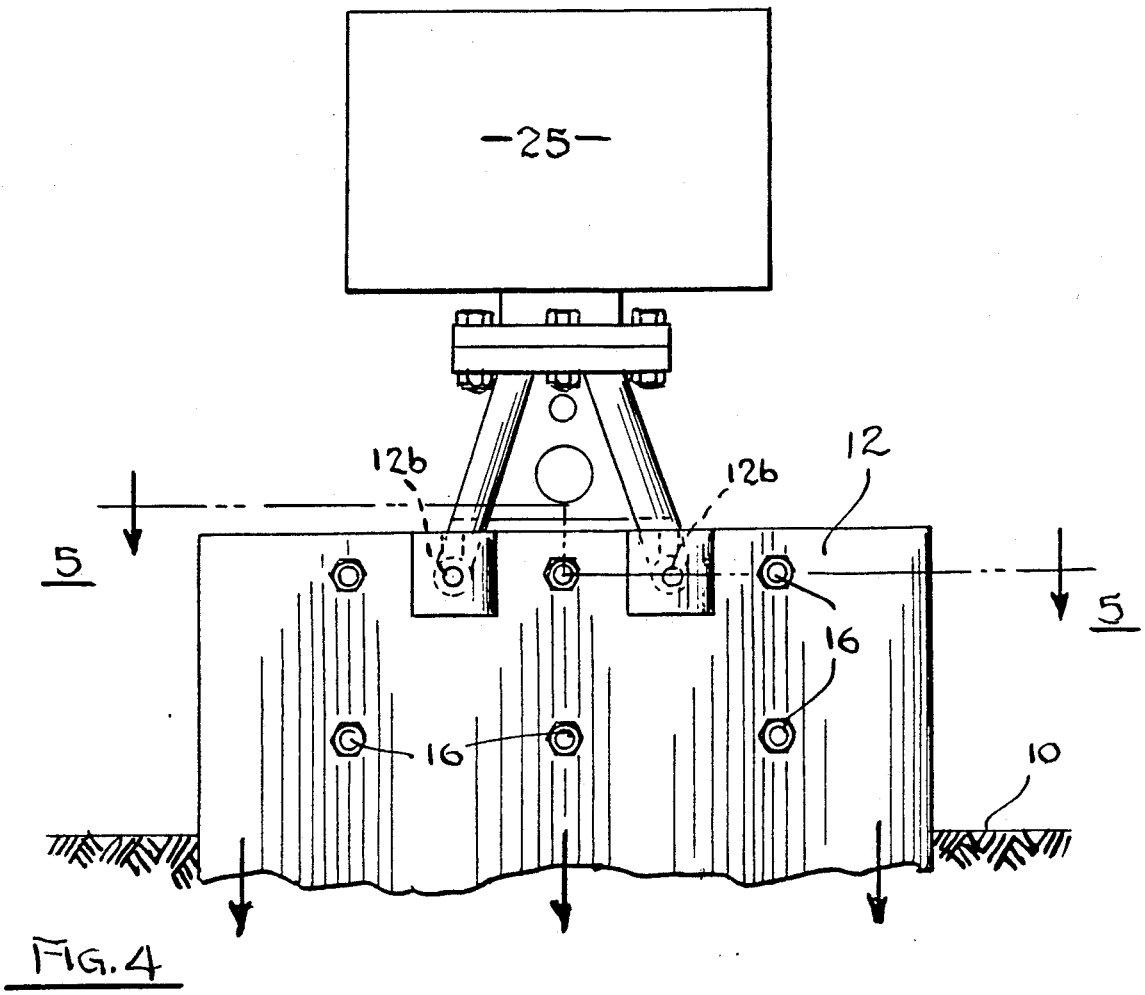
Figure 5:
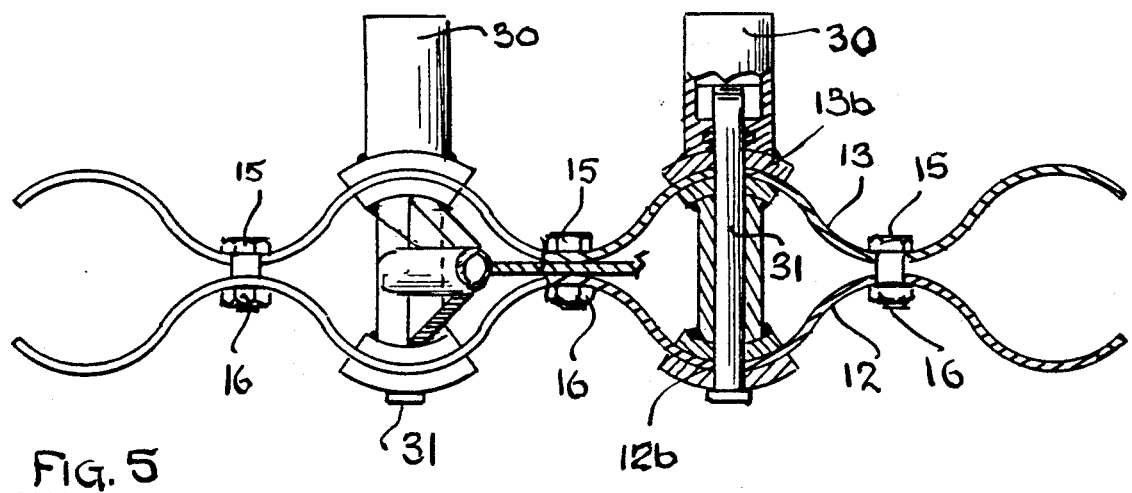
Figure 6:
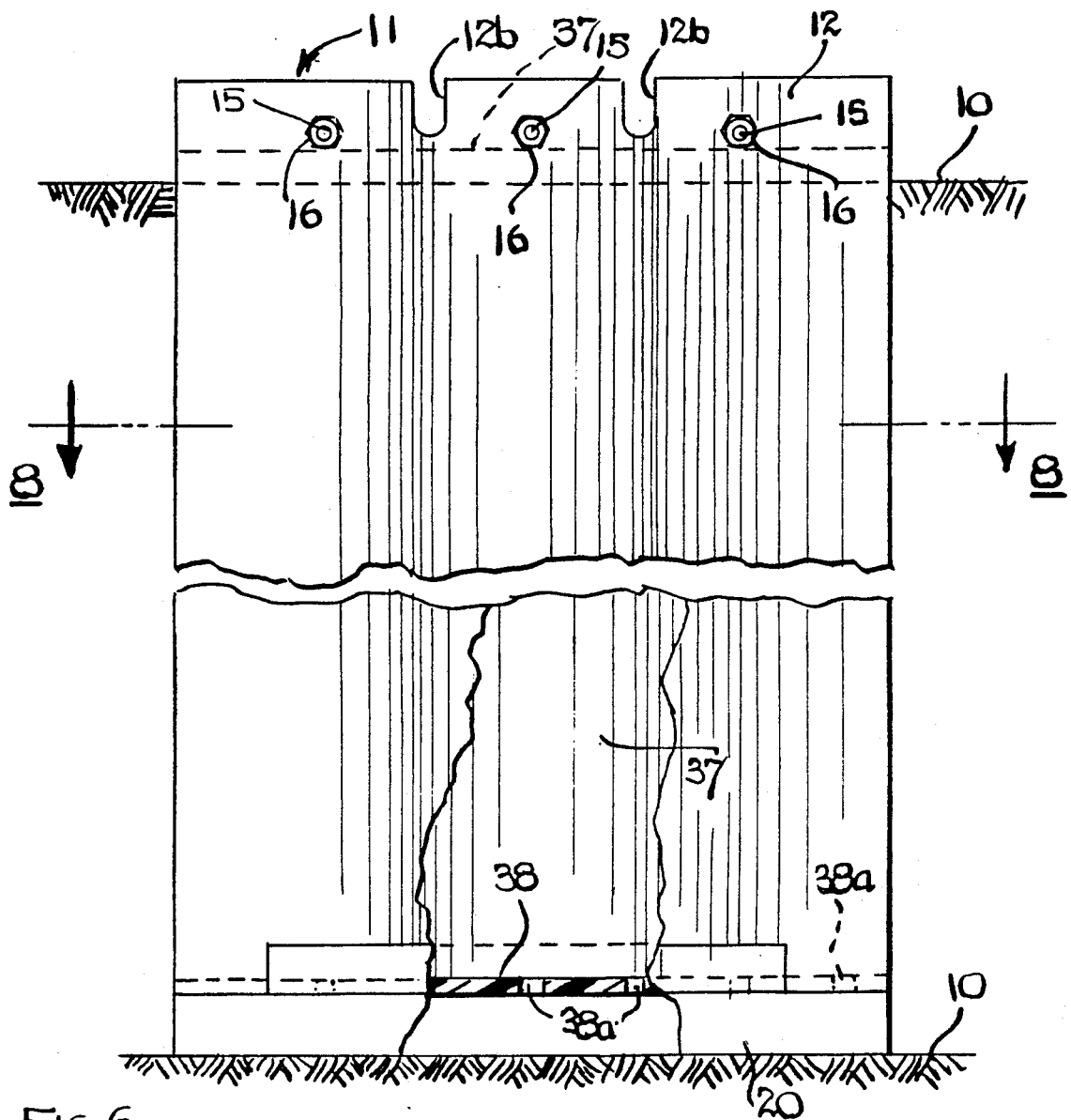
Figure 7:
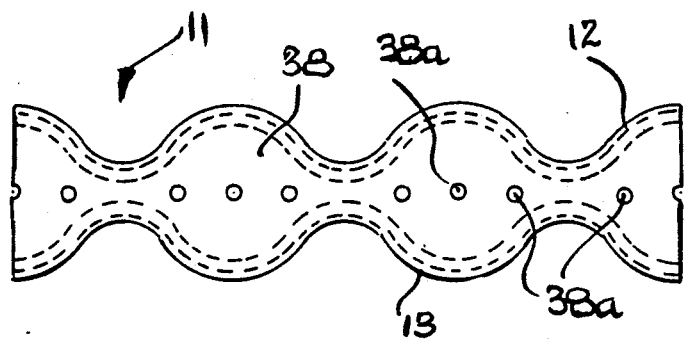

FIG. 3 a top plan view of the structure of FIG. 1;

FIG. 4 is a side elevational view illustrating a section of the barrier box structure of the invention being installed in the ground;

FIG. 5 is a cross sectional view taken along the plane indicated b 5—5 in FIG. 4;

FIG. 6 is a side elevational view with a partial cutaway section of a second embodiment of the invention;

FIG. 7 is a bottom plan view of the second embodiment; and

Figure 8:
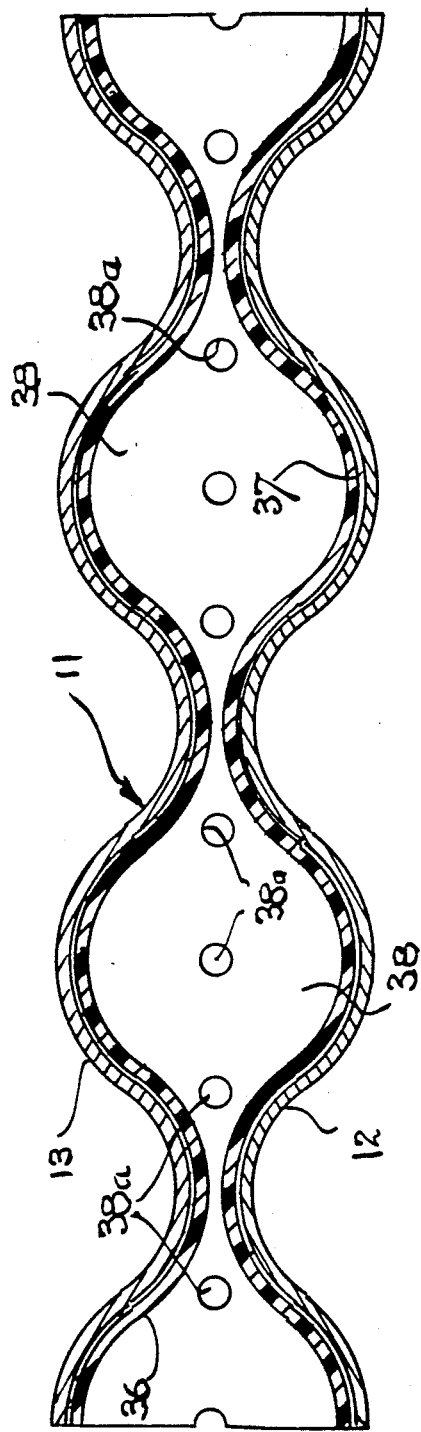

FIG. 8 is a cross sectional view taken along the plane indicated by 8—8 in FIG. 6.

Figure 2:
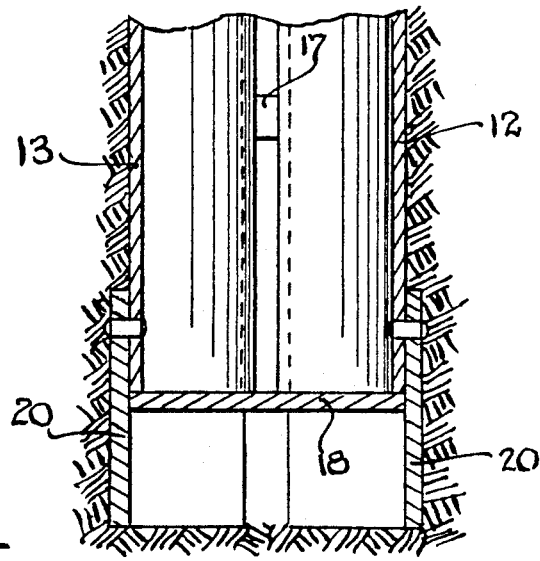
FIG. 2 is a cross sectional view taken along the plane indicated by 2—2 in FIG. 1.

Referring now to FIGS. 1-3 a preferred embodiment of the barrier wall and box-like structure of the invention is illustrated installed in the ground. The box-like structure 11 is comprised of a pair of similar opposing corrugated metal sheets 12 and 13 which may be of steel. Steel sheets 12 and 13 are coated along their inner walls with a thick plastic coating 12a and 13a which coating may be of an epoxy or high density polyethylene material. Corrugated walls 12 and 13 are held together by means of bolts 15 and nuts 16, there being spacer washers 17 inserted between the walls to keep them separated from each other at the corrugations and thus provide continuity between the corrugated sections of the box-like structure. A bottom plate 18 is fixedly attached to the bottom edges of sheets 12 and 13 as for example by welding. Bottom plate 18 has apertures 18a formed therein to permit the entry of fluid into the box-like structure. Fixedly attached to the bottom of sheets 12 and 13 by suitable means such as riveting is an optional drive shoe 20 which extends below the bottom edges of the walls and provides driving edges for driving the structure into the ground under especially dense or tough soil conditions. Successive sections of structure 11 are driven into the ground in overlapping relationship as best can be seen in FIG. 3 to form an elongated structure of any length that may be desired. Notches 12b and 13b are provided in the top edges of plates 12 and 13 to facilitate the attachment of a sonic oscillator thereto for effecting the driving action, as to be described in connection with FIGS. 4 and 5.

The overlapping box structures 11 are installed in the ground 10 in an area in which soil contamination is to be contained and/or monitored. The entire system can be double sealed by introducing oil field cement therein in the same general manner as done in oil fields and then purging this cement from the structure. A fluid monitoring pump can be placed inside the box-like structure to monitor the fluid material therein as may be desired.

Referring now to FIGS. 4 and 5, the installation of the box-like structural sections in the ground is illustrated. An orbiting mass oscillator 25 which may be of the type described in my U.S. Pat. Nos. 3,291,227 and 4,645,017 is clamped to the top edges of sheet members 12 and 13 at notches 12b and 13b thereof by means of hydraulic clamps 30 which operate in conjunction with pins 31 which are fitted into notches 12b and 13b. Oscillator 25 is operated at a frequency such as to set up resonant standing wave vibration of sheets 12 and 13 to drive the box-like structure into the earth 10. Such resonant driving of the structure causes active fluidization of the soil so as to make for settling and compaction of the soil around the metal sheets. A water mixture may be vibratorily introduced into the soil from apertures 18a by filling the space within the box with water to facilitate the back settling of the soil against the metal sheets. The vibratory action aids the mixing of water locally into the soil during driving. Excess water soon leaches away, leaving the soil tightly sealed against the wall.

Referring now to FIGS. 6-8 a second embodiment of the invention is illustrated. In this second embodiment, the walls 12 and 13 of box structure 11 are fabricated with a relatively thick stiff metal material capable of holding its shape with only a single row of bolts 15 and nuts 16 holding the plates together along the top edge portion thereof. As in the prior embodiment, a shoe member 20 is provided along the bottom edge of the plates. However, there is no bottom plate attached to the bottom edges of sheets 12 and 13 as in the previous embodiment. In this embodiment, a pair of corrugated plastic sheets 36 and 37 are inserted within the metal sheets 12 and 13 in a loose fit therein. These plastic sheets are joined together at their bottom edges by a bottom plate 38 which is fixedly attached to such edges. Plate 38 has a plurality of spaced holes 38a formed therein to permit the entry of fluid into the box-like structure formed by the side walls 36 and 37 and bottom wall 38.

The metallic box structure 11 is driven into the ground by means of orbiting mass oscillator 25 in the same manner as in the case of the first embodiment. However, in this instance the plastic box-like structure formed by walls 36 and 37 and bottom plate 38 is carried along with the vibrationally driven assembly 11. Once the box-like structure has been driven to the desired depth, the metallic structure 11 is pulled out of the ground while vibrational excitation thereof is continued. The sonic vibrational energy tends to fluidize the soil so that it settles in good contact with the plastic box structure to retain the structure firmly in the ground. In this manner, successive sections of plastic box-like structures can be installed in overlapping relationship to form the desired barrier and contaminant monitor with the structure 11 being repetitively used to effect the installation.

To further enhance the compaction of the soil against the metal sheets, the sonic oscillator can be run at low amplitude for a few minutes after the full desired penetration has been achieved. In addition, a small amount of mild lubricant can be added to the water introduced into the soil such as, for example, a bio-degradable soap, to further enhance fluidization o the soil and its settling against the metal sheets.

While the invention has been described in detail, it is to be clearly understood that this is intended by way of illustration and example only and is not to be taken by way of limitation, the spirit and scope of the invention being limited only by the terms of the following claims.

I claim:

1. A method for stopping the migration of soil pollution comprising the steps of:
   joining a first pair of continuous one piece metal sheets together in opposing spaced apart relationship;
   joining a second pair of sheets together in opposing spaced apart relationship with a bottom plate between one edge of each of said sheets to form a box-like structure;
   attaching a sonic oscillator to the edges of each of said first pair of sheets;
   inserting said second pair of sheets within said first pair of sheets in loosely fitting relationship thereto;
   sonically driving said first pair of sheets into the ground to a desired penetration depth by means of sonic energy transferred thereto from said sonic oscillator, said second pair of sheets being carried along with the first pair of sheets; and
   while continuing to apply sonic energy thereto drawing said first pair of sheets out of the ground leaving the box-like structure formed by the second pair of sheets in the ground;
   said box-like structure forming a barrier to the spread of pollution and providing means for containing polluting material.

2. The method of claim 1 and further including the step of forming a second box-like structure in the same manner as said first structure and sonically driving said second box-like structure into the ground in end to end overlapping relationship with said first structure.

3. The method of claim 1 wherein the sheets are corrugated and are joined together at their corrugations.

4. The method of claim 1 wherein the sonic oscillator is joined to the top edges of each of said sheets by hydraulic clamp means.

5. The method of claim 1 wherein said sonic oscillator is operated at a frequency such as to effect resonant standing wave of said metal sheets.

6. The method of claim 1 and further including the addition of water into the soil surrounding said sheets to facilitate the back settling of the soil against the sheets.

7. The method of claim 6 and further including the addition of a lubricant to the water added to the soil.

8. The method of claim 1 and further including the operation of the sonic oscillator at a low amplitude for several minutes after the desired penetration depth of said structure has been attained, to facilitate the compaction of soil against the metal sheets.

* * * * *